Nov. 28, 1950 K. E. DORIOT 2,531,505
NOISE SUPPRESSION MEANS FOR COMMUNICATION RECEIVING APPARATUS
Filed Oct. 8, 1947
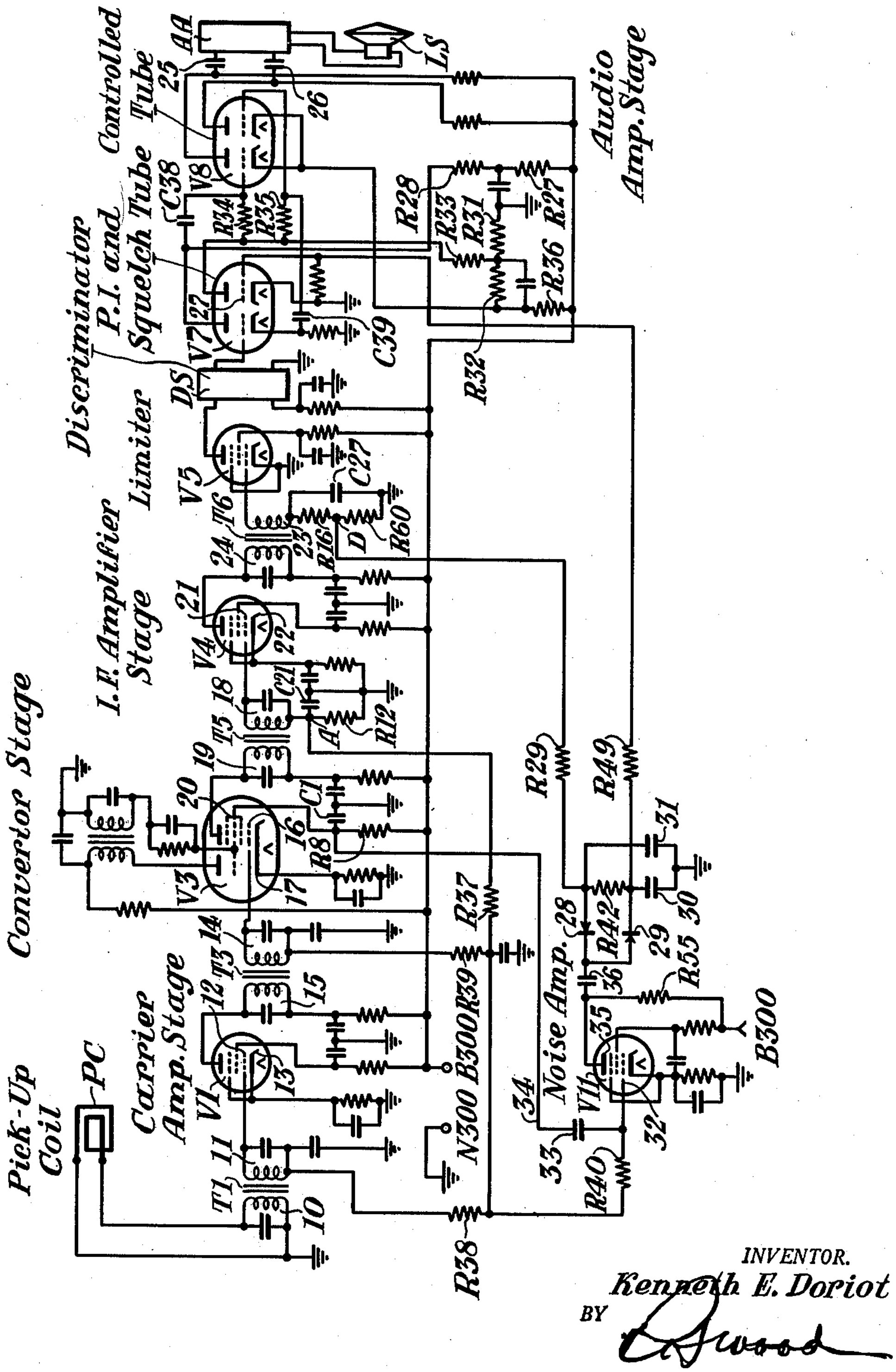
INVENTOR.
Kenneth E. Doriot
BY [signature]
HIS ATTORNEY Patented Nov. 28, 1950

2,531,505

UNITED STATES PATENT OFFICE 2,531,505

NOISE SUPPRESSION MEANS FOR COMMUNICATION RECEIVING APPARATUS

Kenneth E. Doriot, Swissvale, Pa., assignor to The Union Switch & Signal Company, Swissvale, Pa., a corporation of Pennsylvania Application October 8, 1947, Serial No. 778,615

3 Claims. (Cl. 250—20)

My invention relates to noise suppression means for communication receiving apparatus, and more particularly to noise suppression means for the receiving apparatus of systems using frequency modulation.

The receiving apparatus, which is commonly called the receiver, of many communication systems, is retained in an action condition except during sending periods at the same location and spurious energy appearing at the input of the receiver and voltage variations created within the receiver itself may cause bursts of noise at the loud-speaker that are annoying during non-communication periods and they may interfere with the audibility of speech during communication periods.

Furthermore, in communication systems using a relatively low carrier frequency as is the case in many railway train inductive carrier systems, this noise condition is aggravated due to the high noise energy level at the frequencies commonly used.

A so-called "squelch" circuit arrangement has been used in receiving apparatus of the type here involved to cut off the audio output of the apparatus to the noise voltage, the squelch circuit cutting off the audio output until a communication or signaling wave of the proper frequency above a predetermined energy level is applied to the input of the apparatus.

In a frequency modulation receiver having a squelch circuit, a source of noise voltage which varies in accordance with the noise energy but independent of frequency modulated communication or signaling voltage amplified by the receiver is essential for the satisfactory control of the squelch system. Noise is a wide band of amplitude modulated frequencies. Squelch systems heretofore provided have used, as far as I am aware, the noise voltage developed at the grid of an intermediate frequency amplifier tube, or at the grid of a limiter tube, or at the anode of the limiter tube, or at some point beyond the discriminator for the control of the squelch circuit. These circuits have not been entirely satisfactory and especially for systems using narrow band frequency modulation. This is so because in narrow band systems the communication current so often deviates in excess of the flat band pass of the receiver due to over-modulation of the communication energy at the remote transmitter.

Communication energy that deviates in excess of the pass band of the receiver causes amplitude modulation to be developed throughout the receiver due to the signaling energy deviating down the slopes of the resonant characteristic curves of each coupling transformer and which amplitude modulation is carried through to the intermediate frequency amplifier and limiter tubes. The magnitude of such amplitude modulation developed in each individual stage is a small per cent of the amplified signaling energy but when it is amplified 1, 2, or more times, the magnitude of the total amplitude modulation present in the output signaling energy may easily be great enough to cause the squelch circuit to cut off the audio output because this unwanted amplitude modulation due to over-modulation appears as noise energy to the squelch system. Consequently, when such a frequency modulation receiver detects an over-modulated communication current, the squelch system as heretofore provided may cut off the audio stage at the peak of the modulation and only the lesser deviated parts of the words are audible in the output of the receiver. This condition is frequently called "clipping" and it tends to greatly impair intelligibility of the received message.

Again, in a frequency modulation receiver after the amplified communication current applied to the grid of the limiter tube is great enough to saturate the limiter tube, any further increase in the communication energy across the input of the limiter tube will have substantially no effect on the quality or amplitude of the audio output of the receiver. Therefore, any amplification of the communication energy in the amplifier stages ahead of the limiter tube beyond the amount necessary for the signaling energy input to saturate the limiter tube is not necessary. This being so, automatic volume control is frequently applied to the control grids of one or more of the amplifier tubes ahead of the limiter tube, to limit the amplification of the signaling energy of these tubes to the amount just necessary to saturate the limiter tubes when a sufficient signaling voltage of the desired frequency is applied to the receiving apparatus.

When automatic volume control is used with a receiver that is also provided with a squelch system, it is necessary that the noise voltage used to control the squelch circuit is not amplified to any greater degree than that obtained for the communication energy, otherwise noise generated within the receiver itself may cut off the audio output during communication periods.

In view of the foregoing problems in receiving apparatus for communication systems, a feature of my invention is the provision of improved noise suppression means for receiving apparatus for systems using frequency modulation.

Another feature of my invention is the provision of frequency modulation receiving apparatus incorporating an improved squelch system which provides a control voltage that varies according to the noise energy and is substantially independent of the communication or signaling voltage.

Another feature of my invention is the provision of frequency modulation receiving apparatus incorporating an improved noise suppression means to eliminate clipping, that is, the cutting off of the over-deviated peaks of the received communication energy.

Again, a feature of my invention is the provision of frequency modulation receiving apparatus incorporating an improved automatic volume control and squelch circuit network.

A more specific feature of my invention is the provision of improved noise suppression means for the receiver of an inductive carrier railway train telephone system using frequency modulation.

Other features, objects and advantages of my invention will appear as the specification progresses.

To attain the foregoing objects, features and advantages of my invention, I provide frequency modulation receiving apparatus incorporating an improved squelch system and automatic volume control.

The squelch system includes a controlled modulation frequency amplifier tube and a control or squelch tube, the squelch tube governing the sensitivity of the controlled tube and being governed in turn by two voltages developed in the receiving apparatus, one voltage being in accordance with the noise energy in the apparatus and the other voltage being in accordance with the communication current in the apparatus. The voltage developed by the communication or signaling energy is obtained at a grid resistor of a limiter tube of the apparatus and which resistor is by-passed by a capacitor to pass voltage variations around the resistor. A direct voltage is therefore created across the resistor in response to the limiter tube grid current due to the frequency modulation carrier and the voltage variations developed at this point due to amplitude modulation are by-passed by the capacitor. The voltage responsive to noise energy is taken from the screen grid of a converter or mixer tube of the apparatus where it is variable according to the noise energy applied to the input of the apparatus and is substantially independent of the frequency modulated signaling energy. This noise voltage is preferably amplified and then rectified. The connection by which these two voltages are applied to a control grid of the squelch tube are such that the voltage developed due to the noise energy tends to drive the squelch tube to a conductive condition and the voltage developed due to the communication or signaling current tends to drive the squelch tube to a non-conductive condition.

The controlled tube is used to drive an audio frequency amplifier of the apparatus and thus when the controlled tube is desensitized no energy is passed to the audio amplifier and the loud-speaker and other signaling devices are inactive. The sensitivity of the controlled tube is governed through a voltage divider network interposed in the anode circuit of the squelch tube, the arrangement being such that the controlled tube is sensitized or operable at its usual sensitivity according as the squelch tube is conductive to draw anode current through the network or is non-conductive and its anode current reduced.

The automatic volume control here provided uses a voltage developed across a load resistor in the intermediate frequency amplifier grid return circuit to control the gain of the carrier frequency amplifier stages, the converter stage and also the noise amplifier. The parts are proportioned so that amplification is limited to the amount just necessary to saturate the limiter tube when sufficient communication energy of a proper frequency is applied to the input of the receiver. In this manner the magnitude of the amplitude modulation developed within the receiver may be kept to a minimum by not amplifying it any more than that which takes place in amplifying the communication energy enough to saturate the limiter tube. The noise voltage on the screen grid of the converter tube is substantially free of amplitude modulation because the screen grid of the converter tube is not affected by the tuned circuits and also because the amplitude modulation is limited by the automatic volume control on the preceding stages and it is not great enough to be detected on this screen gird. Since there is substantially no amplitude modulation present at the screen grid of the converter tube, the frequency of the received communication energy can deviate far in excess of the band pass of the receiver without causing the squelch circuit to cut off the audio output, and thus when the received communication energy is considerably over-modulated clipping at the audio output of the receiver will be avoided.

When extremely intense communication energy is received and some amplitude modulation appears at the converter tube screen grid, the automatic volume control applied to the noise amplifier greatly decreases the gain thereof and this amplitude modulation will not cause the squelch circuit to cut off the audio frequency appearing at the output of the receiver due to detection of the frequency modulated communication energy.

I shall describe one form of apparatus embodying my invention and shall then point out the novel features thereof in claims.

The accompanying drawing is a diagrammatic view showing one form of receiving apparatus embodying my invention when used with an inductive carrier railway train communication system.

It is to be understood that my invention is not limited to railway train communication systems and this one application serves to illustrate the many places the apparatus is useful.

Referring to the drawing, the receiving apparatus is of the superheterodyne type for frequency modulated carrier current, and it includes a carrier frequency amplifier stage, a converter or mixer stage, an intermediate frequency amplifier stage, a limiter, a discriminator, and an audio amplifier stage together with a squelch system and an automatic volume control circuit. It is to be noted that additional stages of amplification can be included in the apparatus if desired.

The reference character PC designates a receiving element such as a pick-up coil, an antenna, or a transmitting circuit, and which element is capable of receiving a frequency modulated carrier wave sent out by a remote transmitter, not shown. This element PC is connected to the input of an electron tube V1 of the carrier frequency amplifier stage through a transformer T1, a tuned primary winding 10 of the transformer being connected to the element PC and a tuned secondary winding 11 being connected across a control grid 12 and cathode 13 of the tube V1. Tube V1 is a pentode, but other types of tubes can be used. An anode circuit for the tube V1 is powered from positive terminal B300 of a suitable power source provided for the apparatus, negative terminal N300 of the source being connected to ground in the usual manner for the power supply of such receiving apparatus. Thus the carrier frequency wave received by element PC is amplified and a corresponding voltage is developed across the tuned primary winding 15 of a coupling transformer T2 which is interposed in the anode circuit of tube V1. A secondary winding 14 of transformer T2 is connected in turn to the input of a tube V3 of the converter stage and the developed carrier frequency voltage is impressed across the grid 16 and cathode 17 of tube V3.

Tube V3 of the converter stage is here shown as a triode-hexode tube but other tubes can be used. The circuits associated with tube V3 are of the standard form and it is sufficient for this application to point out that the frequency modulated carrier wave that is induced in secondary winding 14 of coupling transformer T2 and is applied to control grid 16 and cathode 17 of the hexode section of tube V3 is mixed with a local generated carrier to produce in a secondary winding 18 of a coupling transformer T5 having a primary winding 19 interposed in the anode circuit of the hexode section of tube V3, an intermediate frequency carrier wave having the frequency modulation of the original wave picked up by the element PC. It is to be pointed out that a screen grid 20 of the hexode section of tube V3 is provided with a voltage from the power source through a resistor R8 having a bypass capacitor C1. The frequency modulation intermediate frequency wave produced in the secondary winding 18 of transformer T5 is applied to control grid 21 and cathode 22 of a pentode tube V4 of the intermediate frequency amplifier stage and the wave is amplified and a corresponding wave is produced in the secondary winding 23 of a coupling transformer T6 having a tuned primary winding 24 interposed in the anode circuit of tube V4.

The tuned secondary winding 23 of transformer T6 is included in the control grid circuit of a limiter tube V5, this circuit also includes a grid return unit comprising a capacitor C27 in parallel with resistors R16 and R60 in series. Tube V5 is shown as a pentode but other tubes can be used.

The constants of the limiter tube V5 and its associated circuits are such that the anode frequency modulated carrier frequency voltage will reach a peak value for a given frequency modulated carrier frequency voltage applied to the control grid of the tube and will not exceed that value greatly for higher applied voltages. The output or anode circuit of the limiter tube V5 is coupled to a discriminator network DS.

The discriminator network DS is shown in block form since the details of such a network are well known and they form no part of my invention. It is sufficient for this application to point out that the constant amplitude frequency modulated waves of the limiter tube output when applied to the discriminator network are converted into a wave of voice frequencies.

The output side of the discriminator network DS is connected to one section of a twin triode tube V7 of which one section serves as a phase inverter. The second or right-hand section as viewed in the drawing of tube V7 serves as a control or squelch tube of a squelch circuit system to be more fully explained shortly. The two sections of tube V7 are coupled to a twin triode controlled modulation frequency amplifier tube V8, the input of the two sections of the tube V8 being arranged in such a manner that the communication energy from the phase inverter section of tube V7 is applied in push-pull to the grids of the two sections of tube V8 and a direct current voltage from the squelch section of tube V7 is applied in parallel to the grids of tube V8. Specifically, the anode and cathode of the phase inverter section of tube V7 are connected to the grids of the two sections of tube V8 through capacitors C38 and C39, respectively, and the anode circuit of the squelch section of tube V7 is connected to the grids of tube V8 through resistors R34 and R35, respectively.

The anode circuit of the phase inverter section of tube V7 is powered from terminal B300 of the power source through resistors R27 and R28 in series. The anode circuit of the squelch section of tube V7 is powered from the power source through a voltage divider network comprising resistors R31 and R32 in series connected across the power source through another resistor R36 and having the junction terminal of resistors R31 and R32 connected to the anode of the squelch section of tube V7 through a resistor R33 of relatively high value.

The controlled tube V8 serves as a modulation frequency amplifier for driving an audio amplifier stage AA, the outputs of the two sections of tube V8 being coupled to the input of the audio amplifier stage through coupling capacitors 25 and 26. The audio amplifier AA is shown conventionally since it may be of a standard arrangement. The output of the amplifier AA is in turn connected to a sound producer such as a loud-speaker LS.

The control or squelch section of tube V7 is normally conductive for reasons to appear hereinafter and its anode current drawn through resistor R33 of relatively high value drops the anode voltage to a relatively low value and therefore the voltages applied through resistors R35 and R34 to the grids of tube V8 are of a relatively low value. The cathode of the two sections of tube V8 are connected to the positive terminal of resistor R32 of the voltage divider and thus they are of a relatively high positive potential with respect to the control grids. In this way the controlled tube V8 is biased to cutoff and is desensitized as long as the squelch section of tube V7 is of normal conduction. With the controlled tube V8 biased to cutoff than no energy is passed to the audio amplifier AA and on to the loud-speaker LS. It is to be seen therefore that as long as the squelch section of tube V7 is conducting, the controlled tube V8 is desensitized and no energy reaches the loud-speaker. When the squelch section is non-conductive the grids of tube V8 are driven in the positive direction and tube V8 is conductive.

The control or squelch section of tube V7 is governed by two biasing voltages applied to control grid 27 of that section through two circuit channels or paths of the squelch circuit system, One path extends from the junction terminal D of resistors R16 and R60 in the grid return circuit of the limiter tube, the connection including resistors R29, R42 and R49. This path is conductive of any direct voltage appearing at the junction terminal D due to the grid current flowing in the limiter tube V5, the terminal D being negative with respect to ground.

The second channel comprises a network including a circuit connection from screen grid 20 of the converter or mixer tube V3, a noise amplifier tube V11, rectifiers 28 and 29, capacitors 30 and 31 and resistors R42 and R49.

The noise amplifier tube V11 is a pentode but other tubes can be used. A control grid 32 of the noise amplifier tube V11 is connected to screen grid 20 of the coverter tube V3 through the circuit connection which includes a capacitor 33 and wire 34. The anode 35 of tube V11 is powered from terminal B300 through resistors R55. Thus a variant voltage in accordance with the noise energy appearing at screen grid 20 of the converter tube V3 is applied to the control grid of the noise amplifier tube V1 and a corresponding voltage variation is developed in the anode circuit of tube V11. The anode circuit of tube V11 is coupled to rectifiers 28 and 29 through a capacitor 36 to rectify the voltage variations thus produced in the anode circuit. The rectifiers 28 and 29 are connected to capacitors 30 and 31 and resistor R42 in such a manner that the capacitors 30 and 31 are alternately charged by the output of the rectifiers and the voltage built up across capacitors 30 and 31 appears across resistor R42, the lower terminal of resistor R42 as viewed in the drawing being the positive terminal. This voltage thus created across resistor R42 is in turn applied to control grid 27 of the squelch section of tube V7 through resistor R49.

It is to be seen therefore that the two biasing voltages applied to the control grid 27 of the squelch section of tube V7 oppose each other, the one voltage developed at terminal D of the limiter tube grid circuit tending to drive the control grid 27 of the squelch tube in the negative direction to make the squelch tube nonconductive and the other voltage derived from the screen grid 20 of the converter tube amplified and rectified in the noise amplifier circuit tending to drive the control grid 27 in the positive direction causing the squelch tube to be conductive.

The automatic volume control circuit extends from a terminal A of a grid return resistor R12 of the intermediate frequency amplifier tube V4 through resistor R37 to control grids of tubes V1, V3 and V11 in multiple, the connection to control grid 12 of tube V1 including resistor R38, the connection to control grid 16 of tube V3 including resistor R39 and the connection to control grid 32 of tube V11 including resistor R40.

In describing the operation of the apparatus I shall first consider the normal stand-by condition, that is, when the apparatus is powered and no communication energy is being received. Under this normal stand-by condition the noise energy present at the input of the apparatus is applied to the carrier amplifier and amplified and passed to the converter stage. This noise energy will develop corresponding voltage variations at screen grid 20 of the tube V3. These voltage variations will be in part by-passed by the capacitor C1 and also applied to the noise amplifier tube V11 and then rectified and the resultant direct current voltage developed across resistor R42. This direct current voltage is applied in turn to the squelch section of tube V7 to drive the control grid 27 in the positive direction and cause the squelch tube section to be conductive. Also, this noise energy will appear at the input of the limiter tube creating a grid current therethrough. The amplitude modulation voltage variations created across the resistors R16 and R60 of the grid circuit of the limiter tube are by-passed by capacitor C27 and substantially no direct voltage appears in the junction terminal D of the resistors. The net result of this noise energy is that the squelch tube is made conductive due to the noise voltage derived from the screen grid of the tube V3 and the anode current drawn by the squelch tube biases the controlled tube V8 to cutoff so that the noise energy does not reach the audio amplifier AA and the loud-speaker LS. The parts are so proportioned that the noise energy usually present at the input of the receiving apparatus is sufficient to bias the controlled tube V8 to cutoff and avoid the noise energy being sounded in the loud-speaker. Furthermore, the noise voltages created within the apparatus ahead of the converted tube will serve to govern the squelch tube to desensitize the controlled tube V8 and the noise energy does not appear at the loud-speaker.

I shall next consider that communication energy is picked up by the element PC and applied to the input of the apparatus. This communication energy is frequency modulated and is amplified and heterodyned with the local generated carrier at the converter tube, further amplified at the intermediate frequency amplifier tube and applied to the input of the limiter tube. This communication energy being of frequency modulation, a steady direct voltage is created at terminal D of the limiter tube due to the grid current and this direct voltage appearing at terminal D is applied to the control grid 27 of the squelch tube tending to bias the squelch tube to a non-conductive condition. The frequency modulation energy will create substantially no voltage variation at the screen grid 20 of the converter tube. Thus the positive direct voltage appearing at the lower terminal of resistor R42 due to the voltage variation at the screen grid 20 of the converter tube is that created due to the noise energy only and it will be opposed by the direct voltage from terminal D as created by the communication energy. The parts are so proportioned that the voltage from terminal D due to the communication energy is sufficient to bias the squelch tube to substantially a non-conductive condition when the communication current at the input is of a given energy level. With the squelch tube made non-conductive then the controlled tube V8 becomes conductive and the audio frequencies of the communication energy developed at the output of the discriminator are passed to the audio amplifier AA and on to the loud-speaker.

It is to be noted that the frequency modulation energy when applied to the grid of the intermediate frequency amplifier tube V4 would create a direct current voltage across resistor R12, the terminal A of resistor R12 being negative with respect to ground. Also, the voltage variation at this point caused by amplitude modulation energy will be by-passed by a capacitor C21. For communication energy above the minimum given value set for the receiving apparatus, the voltage developed at terminal A and applied to the automatic volume control circuit reduces the gain of the carrier frequency amplifier, the converter stage and the noise amplifier, and the noise voltage is quieted as well as the gain for the communication energy being held to that just sufficient to saturate the limiter tube.

Since there is substantially no amplitude modulation voltage present at the screen grid of the converter tube V3, the frequency of the received communication energy can deviate up to the order of 200 per cent of the flat band pass of the receiving apparatus without causing the squelch system to cut off the audio output due to the amplitude modulation created in the apparatus by the over-deviation of the communication energy. Therefore, the received communication energy may be considerably over-modulated without clipping of the audio output of the apparatus.

The receiving apparatus here provided has the advantages that the voltage used to control the squelch system varies in accordance with the noise energy at the input and is independent of the communication energy voltage amplified within the receiver and clipping of the audio frequency output due to over-modulation of the communication energy is avoided.

In using the noise voltage present at the screen grid of the converter tube in conjunction with automatic volume control applied to the carrier amplifier tube, to the converter tube itself and to the noise amplifier, the noise voltage is free of amplitude modulation developed within the receiver. Also the noise voltage is quieted when communication energy is received at the input of the apparatus. That is, in using the noise voltage at the mixer tube screen grid, the noise voltage is free of amplitude modulation developed within the receiver, and, due to the automatic volume control here provided, noise voltage is quieted when communication energy of the required frequency and amplitude is applied to the receiving apparatus.

Although I have herein shown and described but one form of noise suppression means for communication receiving apparatus embodying my invention, it is understood that various changes and modifications may be made therein within the scope of the appended claims without departing from the spirit and scope of my invention.

Having thus described my invention, what I claim is:

1. In a receiver responsive to frequency modulated communication current and subject to noise energy and including a frequency converter stage, an amplifier limiter stage, a discriminator stage and an audio amplifier stage; the converter stage including an electron tube having a screen grid as well as input and output electrodes, the screen grid being connected to a voltage source and provided with a load resistor, the amplifier limiter stage and the audio amplifier stage each including an electron tube having input and output electrodes, an input circuit including a bias unit comprising resistance and capacitance in multiple to couple the output electrodes of the converter stage tube to the input electrodes of the limiter stage tube, and the input electrodes of the audio amplifier stage tube being coupled to the output electrodes of the limiter stage tube through the discriminator to create at the output electrodes of the audio amplifier stage tube a wave corresponding to the communication current and noise energy applied to the input electrodes of the converter stage tube, the improvement with the foregoing elements comprising; a switching electron tube having an anode, a cathode and a control grid; a circuit including a current source and resistance connected to said anode and cathode, means to connect said anode cathode circuit of said switching tube to the input electrodes of the audio amplifier stage tube to bias that tube according to the anode current of said switching tube, a first circuit means including resistance to connect the bias unit of the limiter stage tube to said control grid of the switching tube, a second circuit means including a capacitor and a rectifier to connect the screen grid of the converter stage tube to said control grid of said switching tube, and said first and second circuit means connected with such polarity that a bias voltage which is the difference between a voltage derived from the limiter stage tube input circuit due to the communication current and a voltage derived from the screen grid of the converter stage tube due to noise energy is applied to said control grid of said switching tube.

2. In noise suppression means for a receiver responsive to frequency modulated communication current and subject to noise energy and which receiver includes a frequency converter stage, an amplifier limiter stage, a discriminator stage and an audio amplifier stage; said converter stage including an electron tube having a screen grid as well as an anode, a cathode and a control grid; the screen grid being connected to a voltage source and provided with a load resistor; the limiter stage and audio amplifier stage each including an electron tube having an anode, a cathode and a control grid; an input circuit including a bias unit having resistance and capacitance in multiple connected to said control grid and cathode of the limiter stage tube and coupled to the anode and cathode of the converter stage tube, another input circuit connected to the control grid and cathode of the audio amplifier stage tube and coupled to the anode and cathode of the limiter stage tube through the discriminator whereby there is created at the anode of the audio amplifier stage tube a wave corresponding to the modulation of the communication current and noise energy applied to the control grid of the converter stage tube, the combination comprising; a control electron tube having an anode, a cathode and a control grid; an anode circuit including a current source and a resistor connected to said anode and cathode of said control tube, means to connect said anode circuit to said control grid of the audio amplifier stage tube to bias that tube according to the anode current of said control tube, a first circuit to connect the bias unit of the input circuit of the limiter stage tube to said control grid of said control tube, a second circuit including a capacitor and a rectifier to connect the screen grid of the converter stage tube to said control grid of said control tube, and said first and second circuits connected with such polarity that a bias voltage which is the difference between a voltage derived from the input circuit of the limiter stage tube due to the communication current and a voltage derived from the screen grid of the converter stage tube due to noise energy is applied to said control grid of said control tube.

3. In noise suppression means for a frequency modulated current receiver having a frequency converter stage, an amplifier limiter stage, a discriminator stage and a modulation frequency amplifier stage connected in cascade; the converter stage including an electron tube having a screen grid as well as an anode, a cathode and a control grid; the limiter stage and the modulation frequency amplifier stage each including an electron tube having an anode, a cathode and a control grid; a screen grid circuit including a voltage source and a load resistor connected to the screen grid and cathode of the converter stage tube, a control grid circuit including resistance and capacitance in multiple connected to the control grid and cathode of the limiter stage tube, the combination comprising; a control electron tube having an anode, a cathode and a control grid; a circuit including a current source and a resistor connected to said anode and cathode of said control tube to provide a current flow governed by a bias voltage applied to said control grid of that tube, means to connect said resistance of the anode cathode circuit of the control tube to the control grid of the modulation frequency amplifier tube to bias the modulation frequency amplifier tube according to the anode current of the control tube, a first circuit to connect the resistance of the grid cathode circuit of the limiter stage tube to said control grid of said control tube to supply a first bias voltage to said control tube according to the frequency modulated current applied to the limiter stage tube, a rectifier, a capacitor, a second circuit including said rectifier and capacitor to connect the screen grid of the converter stage tube to said control grid of said control tube to supply a second bias voltage to the control grid according to noise energy applied to the converter stage tube, and said first and second circuits connected for said first and second bias voltages to oppose each other.

KENNETH E. DORIOT.

REFERENCES CITED

The following references are of record in the file of this patent:

UNITED STATES PATENTS

| Number | Name | Date |
|---|---|---|
| 2,070,354 | Brand | Feb. 9, 1937 |
| 2,098,286 | Garfield | Nov. 9, 1937 |
| 2,239,901 | Percival | Apr. 29, 1941 |
| 2,334,468 | Adams | Nov. 16, 1943 |
| 2,372,934 | Campbell | Apr. 3, 1945 |
| 2,400,948 | Peterson | May 28, 1946 |